US012594777B2

(12) United States Patent
Paul

(10) Patent No.: US 12,594,777 B2
(45) Date of Patent: Apr. 7, 2026

(54) DEVICE AND METHOD FOR EXERTING A STRETCHING ON A RECORDING MEDIUM

(71) Applicant: Canon Production Printing Holding B.V., Venlo (NL)

(72) Inventor: Andreas Paul, Vaterstetten (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 18/825,253

(22) Filed: Sep. 5, 2024

(65) Prior Publication Data

US 2025/0074087 A1 Mar. 6, 2025

(30) Foreign Application Priority Data

Sep. 6, 2023 (DE) ..................... 10 2023 123 942.2

(51) Int. Cl.
*B41J 15/16* (2006.01)
*B41J 2/01* (2006.01)

(52) U.S. Cl.
CPC .................................... *B41J 15/16* (2013.01); *B41J 2/01* (2013.01)

(58) Field of Classification Search
CPC .... B41J 15/16; B41J 11/0005; B41J 11/0085; B65H 2404/61; B65H 2406/351; B65H 29/00
See application file for complete search history.

(56) References Cited

U.S. PATENT DOCUMENTS

| | | | | |
|---|---|---|---|---|
| 5,797,327 | A * | 8/1998 | Gieser | B41F 21/00 226/97.1 |
| 9,010,925 | B2 * | 4/2015 | Leighton | B41J 11/005 414/676 |
| 2012/0168280 | A1 | 7/2012 | Batzer et al. | |
| 2012/0240370 | A1 | 9/2012 | Newhouse et al. | |
| 2020/0369485 | A1 | 11/2020 | Huybreckx | |

FOREIGN PATENT DOCUMENTS

| | | | |
|---|---|---|---|
| DE | 102004038165 B4 | 4/2005 | |
| DE | 102011107188 A1 | 8/2012 | |
| DE | 102015008081 A1 * | 12/2016 | B65H 23/0251 |

(Continued)

OTHER PUBLICATIONS

Search Report issued in EP24197836 on Jan. 22, 2025.

*Primary Examiner* — Christle I Marshall
(74) *Attorney, Agent, or Firm* — The Webb Law Firm

(57) ABSTRACT

Provided is a device for exerting a stretching on a recording medium. The recording medium rests with its back side on at least one respective contact region of a plurality of bearing element regions of at least one bearing element. The bearing element regions are arranged transverse to a transport direction of the recording medium and stand out from a base body. A portion of the bearing element regions stand out from the base body such that their end connected to the base body has a greater distance from a lateral edge of the recording medium than their contact region distal from the base body. A negative pressure is applied between at least two bearing element regions arranged next to one another to move the recording medium in the direction of the base body and a portion of the bearing element regions are deformed to exert a force on the recording medium.

13 Claims, 7 Drawing Sheets

(56) References Cited

FOREIGN PATENT DOCUMENTS

| | | | | | |
|---|---|---|---|---|---|
| EP | 1069060 | A2 | * | 1/2001 | ............. B65H 5/224 |
| GB | 2273489 | A | * | 6/1994 | ........... B65H 29/245 |
| JP | 2001139198 | A | | 5/2001 | |
| JP | 2010099851 | A | * | 5/2010 | |
| WO | 2011038279 | A1 | | 3/2011 | |

* cited by examiner

DEVICE AND METHOD FOR EXERTING A STRETCHING ON A RECORDING MEDIUM

CROSS-REFERENCE TO RELATED APPLICATION

This application claims priority to German Patent Application No. 10 2023 123 942.2 filed Sep. 6, 2023, the disclosure of which is hereby incorporated by reference in its entirety.

BACKGROUND OF THE INVENTION

Field of the Invention

Given a device and a method for exerting a stretching on a on recording media, the recording medium can be transported in a transport direction along a transport path. In some printing devices, immobile printing units are used that are as wide as a page and stationary. In other printing devices, print heads that are movable transverse to the transport direction are used so that the image information is applied in a scanning manner to the recording medium. This is independent of whether the recording medium is present as roll material or as individual sheets. The recording medium can also be moved beneath the application unit. Alternatively, or in combination with this, it is not the recording medium that is moved but rather the application unit. Here an application unit can be a printing unit and/or coating unit.

Description of Related Art

In inkjet printing, the liquid ink is applied non-uniformly onto the recording medium depending on the print image to be generated. Both paper sheets or paper webs, as well as cardboard, can serve as a recording medium. However, other recording media, such as films, can also be used.

Given printing to paper with liquid link, moisture enters into the paper, whereby ripples arise in the paper that, without taking further measures, remain even after fixing the print image onto the paper. The moisture is affected by, for example, the water fraction, glycerol fraction, or similar fluids. The recording medium swells at different rates depending on the type of fluid. Moreover, the quantity of fluid/ink is distributed non-uniformly due to regions being printed to with different intensity. The ripples in the paper are particularly pronounced in regions of the paper that are printed to over their entire area. Although ripples in the paper also occur given other printing methods, such as in offset printing, this is not as strongly as in inkjet printing.

Similarly, the moisture is strongly influenced differently in local terms. In regions that have been printed to with a high quantity of ink, among other things the evaporation is often less, due to the film formation, than in regions that have not been printed to.

Depending on the manufacturing process, the paper has a machine direction (MD), i.e. the transport direction of the paper in the paper manufacturing, and a cross direction (CD) transverse to the machine direction, and thus transverse to the transport direction of the paper in the paper manufacturing. The paper properties in CD and MD differ significantly with regard to rigidity, moisture expansion, and rupture resistance. Paper swelling always avoids the primary fiber direction. Fibers swell 20× less in the fiber direction than transverse to it. Given paper (network of fibers) with a partial alignment, the relation is only 1:3 (MD:CD).

In high-capacity printing with printing speeds of greater than 1 m/s, up to the present speeds of 3 m/s, the paper in the form of a web that is to be printed to is often unwound taken off a paper roll. The machine direction is then in the take-off [unwinding, unrolling] direction or in the transport direction of the paper through the printing device. In printing to individual sheets, the machine direction is not set uniformly and can vary from charge to charge.

In addition to inkjet, the cited printing process encompasses all additional digital and analog printing methods, such as electrophotography, offset printing, flexography, and rotogravure. In addition to this, the application of coatings with or without colorant is likewise included.

The rippling due to the entry of fluid into the paper (or the different moisture distribution due to drying in the fixing process) that took place via the ink arises primarily in the cross direction. Given web printing, the recording medium is preferably unrolled along the MD direction and moved through the printer so that, upon printing to paper webs, the rippling arises transverse to the transport direction of the paper web.

SUMMARY OF THE INVENTION

It is an object of the invention to specify a device and a method for exerting a force on a recording medium to be printed to on its front side. With this force, the recording medium should be actively stretched in order to prevent ripple formation.

This object is achieved via a device having the features as described herein, and via a method having the features as described herein. Advantageous developments are described herein.

The invention is based on the realization that the ripples in the recording medium after being printed to with the aid of an inkjet printing device, even after the fixing of the print image on the recording medium, are reduced if a force in the cross direction is exerted on the recording medium upon printing to said recording medium, and/or between printing to said recording medium, and/or upon fixing the print image on said recording medium. The cross direction thereby relates to the direction in the paper manufacturing, and is also always transverse to the direction of running travel of the web given web printing. It has proven to be particularly advantageous if the force is exerted on the medium material during the fixing of the print image, in particular in the second half of the fixing unit, in which the print image is completely fixed or completely dried. This force should have at least one force vector in an optimally wide range in the CD between the lateral edges of the recording medium.

However, the front side of the recording medium, on which is located the print image that as of yet has not been fully fixed, should not be contacted upon exerting the force, in order to not negatively affect the print image and/or not prevent the fixing process, or in order to make an unprinted edge unnecessary.

Via the device as described herein, it is achieved that at least a portion of the bearing element regions are deformed such that they exert a force on the recording medium, said force being directed in the direction of the respective lateral edge. The respective lateral edge is thereby the lateral edge with the shorter distance from the contact region of the bearing element region. The contact regions contacting the back side of the recording medium preferably exert on the recording medium a tensile force transverse to the transport direction of the recording medium, i.e. a force in the direction of the lateral edge. The recording medium is preferably a recording medium in form of a web, in particular is a paper web. The material of at least the contact region of the bearing element region is matched to the material of the recording medium so that a static friction is present between the contact region and the back side of the recording medium, via which static friction a force can be transmitted from the contact region to the recording medium, which force generates at least one tensile force along the recording medium that reduces, or prevents to the greatest possible extent, the formation of ripples due to the moisture introduced into the recording medium by the ink. The quality of the printed recording medium can hereby be significantly increased.

It is also advantageous if a first end of each bearing element region is connected with the base body, and if the contact region is arranged at the second end of the bearing element region, said second end being distal from the base body. The bearing element region can hereby stand out from the base body, and the contact region can be arranged at a distance from the base body so that the recording medium can rest on the contact regions.

It is also advantageous if the lateral edges of the moving recording medium run parallel to the transport direction. A simple handling of the recording medium upon exerting the force to reduce and/or prevent ripples in the recording medium is hereby possible.

It is also advantageous if, in the transport direction, a first portion of the bearing element regions is arranged to the left and a second portion of the bearing element regions is arranged to the right of a center plane running orthogonal to the transport path and/or to the recording medium in the transport direction. The contact regions of the bearing element regions can hereby exert a tensile force in two opposite directions, i.e. tensile force and counterforce, on the recording medium. The recording medium is thus not laterally displaced upon transport of the recording medium.

The transport unit can transport the recording medium in a transport plane, wherein a center plane of the transport route runs orthogonal to the transport plane.

It is also advantageous if the end of at least one part of the bearing element regions that is connected with the base body has a smaller distance from a center plane, said center plane running orthogonal to the transport path/recording medium in the transport direction, than the contact region of the same bearing element. These bearing element regions hereby extend away from the center plane or, respectively, toward the lateral edges. The bearing element regions arranged at the outer edges of the recording medium are preferably arranged angled and/or curved and/or inclined, starting from the end connected with the base body, toward the respective lateral edge. Alternatively, or in combination, the bearing element might also have been produced from a solid material from which angled slits have been milled, or slightly pre-tensioned bearings that permit a twisting "outward" if a negative pressure is present. Upon applying the negative pressure, the recording medium is then drawn in the direction of the base body and exerts a force on the contact regions in the direction of the base body. Due to the inclined, angled, and/or curved arrangement of the bearing element regions, these are moved outward in the direction of the lateral edge and exert a force transverse to the transport direction on the recording medium, via which the force is exerted on the recording medium to reduce and/or prevent ripples in said recording medium.

It is also advantageous if the contact region of the first end of the bearing element region forms an angle vertex, wherein the route between angle vertex and contact region forms a first angle leg, and wherein the base body forms a second angle leg, wherein the angle of inclination that is so defined is arranged in a plane orthogonal to the transport direction and preferably has a value in a range of from 45° to 85°, preferably in a range of from 65° to 75°.

It is particularly advantageous if the contact region has the form of a lip, and/or if the bearing element region and/or the contact region extends parallel to the transport direction. A simple arrangement of the device relative to the recording medium is hereby possible via which ripples in the recording medium can be reduced or avoided.

It is also advantageous if the device is arranged below the fixing unit for fixing an inkjet print image and below the printed recording medium. The device is hereby arranged on the back side of the recording medium, or opposite the back side of the recording medium. It is particularly advantageous if the device is arranged below the second half of the fixing unit in the transport direction.

An arrangement is also disclosed with a device as described herein, and a recording medium, wherein the recording medium is in particular a paper web and/or individual sheets.

The method having the features described herein has the same advantages as the device described herein.

BRIEF DESCRIPTION OF THE DRAWINGS

Exemplary embodiments of the invention are explained in detail in the following using FIGURES. Shown therein are.

The terms Fig., Figs., Figure, and Figures are used interchangeably in the specification to refer to the corresponding figures in the drawings.

DESCRIPTION OF THE INVENTION

Figure 1:
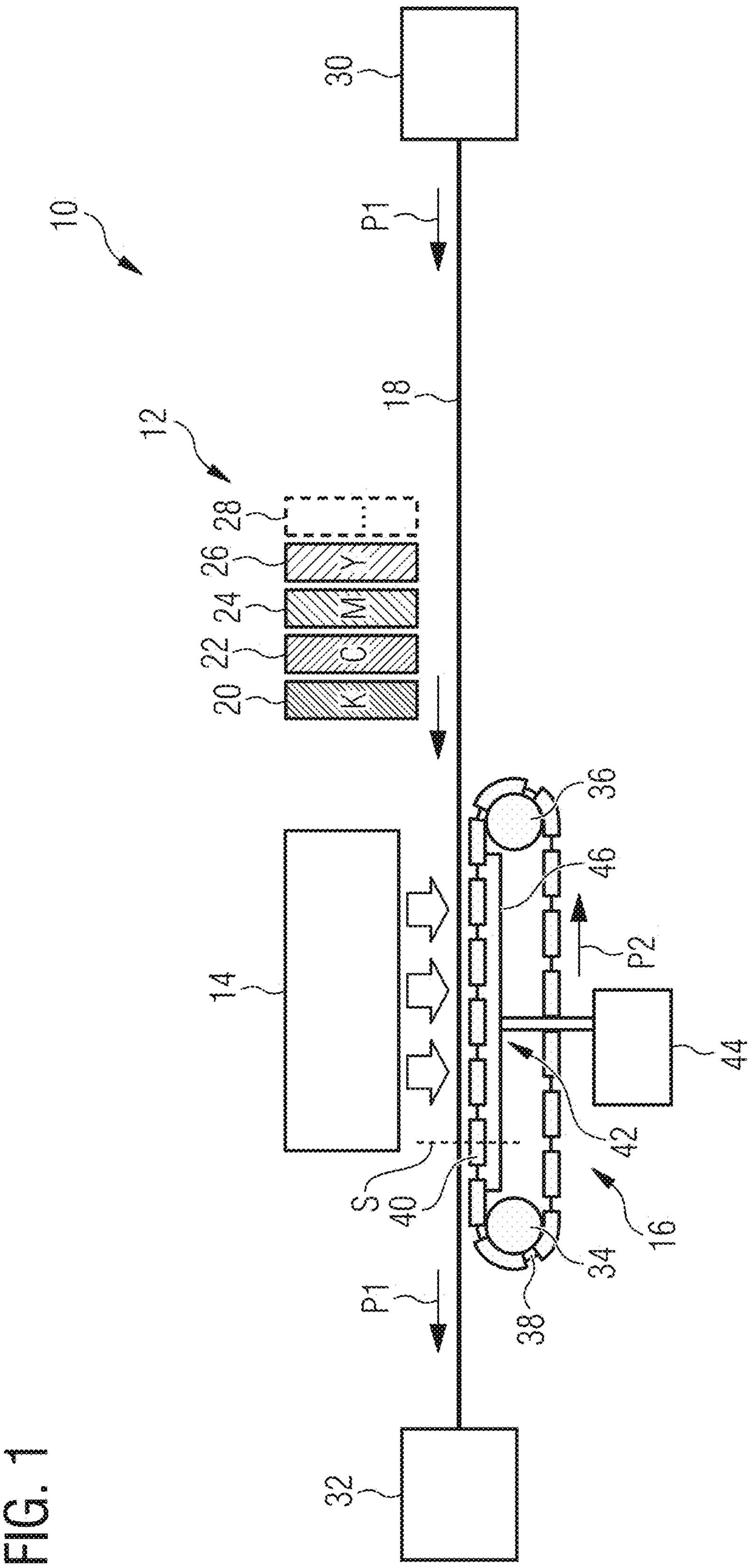
FIG. 1 a schematic depiction of an inkjet printer of at least one printing device, a fixing device, and a device or exerting a force on a recording medium printed to on its front side, according to a first embodiment.

FIG. 1 shows a schematic depiction of an inkjet printer 10 having at least one inkjet printing unit 12, a fixing unit 14, and a device 16 for exerting a force on a recording medium 18 printed to on its front side, according to a first embodiment. The inkjet printer 10 is in particular a high-capacity printer with print speeds of greater than 1 m/s, presently up to 3 m/s.

The printing unit 12 serves to print to the front side of the recording medium 18 in the form of a web, executed as a paper web. The recording medium 18 is supplied to the printer 10 in that, for example, it is taken off from a roll with the aid of a take-off [unwinder] 30. The transport direction of the recording medium 18 through the printer 10 is specified by the arrow P1.

In the present exemplary embodiment, the printing unit 12 comprises four print bars 20, 22, 24, 26 to generate a respective color separation in the colors Y, M, C, K, and a unit for applying a primer onto the recording medium 18 supplied to the printing unit 12. The unit can comprise a further print bar 28 for applying a primer. This print bar 28 is then arranged upstream of the print bar 20 through 26 for application of the ink.

A print bar 20 through 28 of the printing unit 12 is preferably a unit that comprises at least one print head in order to print a line onto the recording medium 18. Upon printing the color separations, neither the print bars 20 through 28 nor the print heads of the print bars 20 through 28 are moved. The recording medium 18 is printed to across the width of the page with the aid of the print bars 20 through 28. In particular, each print bar 20 through 28 can comprise a plurality of print heads arranged one after another in two rows. The print head, or the print heads, of the print bars 20 through 28 can be driven based on print image data to print color separations printed atop one another. The color separations printed atop one another then yield a print image.

The fixing unit 14 serves to generate a robust surface by drying and fixing, onto the recording medium 18, the print image generated by the printing unit 12 on said recording medium 18, said print image being made up of ink. The recording medium 18 is taken up again onto a roll with the aid of a take-up 32 after being printed to with the fixed print images. The roll with the printed recording medium 18 can then be processed further at a later point in time.

Given alternative embodiments, the printing unit 12 can have more or fewer print bars 20 through 28 and/or not apply any primer. The printed recording medium 18 can also be directly supplied to a finishing unit, such as a cutting unit to cut the recording medium into single sheets, without being taken up again beforehand. Instead of the take-up 32, a further printer can also be arranged with the aid of which the back side of the recording medium is printed to. The further printer can have a design identical to that of the printer 10, wherein a turning unit known per se is then arranged between the two printers.

Given inkjet printing, in the printing state the liquid ink is applied non-uniformly onto the recording medium 18 depending on the print image to be generated. This is required to achieve different colors, for example locally different colors in images. However, it is also conceivable that the print heads also applies the ink from the side, which ink is liquid in the printing state. Moisture arrives into the recording medium 18 due to the application of liquid ink, whereby ripples arise in the recording medium 18, which ripples—without further measures—remain on the recording medium 18 even after the fixing of the print image with the aid of the fixing unit 14. Moreover, the quantity of fluid/ink is distributed non-uniformly on the front side of the recording medium 18 due to regions being printed to with different intensity. The ripples in the recording medium 18 are especially pronounced in regions of the recording medium 18 that have been printed to over their entire area.

Depending on the manufacturing process, the paper serving as a recording medium has a machine direction (MD), i.e. the transport direction of the paper in the paper manufacturing, and a cross direction (CD) transverse to the machine direction, and thus transverse to the transport direction of the paper in the paper manufacturing. Upon printing to paper webs 18, the paper to be printed to can be taken off a paper roll. The machine direction is then in the take-off direction or in the transport direction P1 of the paper web 18 through the printer 10.

The rippling due to the fluid entry into the paper of the recording medium 18, which took place via the ink, arises primarily in the cross direction, i.e. transverse to the transport direction of the paper web 18 upon printing to paper webs 18.

Ripples in the transport direction P1 can be reduced in particular in that a tensile force in the transport direction P1 is exerted on the recording medium 18. For this purpose, the recording medium 18 can be pulled by transport elements, in particular by a corresponding drive of the take-off 30 and of the take-up 32, and/or further transport elements of a transport unit for transporting the recording medium 18 through the printer 10.

In order to avoid, or at least to reduce, ripples transverse to the transport direction P1 in the recording medium 18, the printer 10 has a device 16 for exerting a force on the recording medium 18 that is printed to on its front side with the aid of the printing unit 12. Via this device 14, a tensile force is exerted on the recording medium 18 transverse to its transport direction P1, wherein the recording medium 18 is stretched by the tensile force upon fixing the print image on the front side of said recording medium 18. The position of the recording medium 18 transverse to the transport direction P1 thereby remains unchanged.

The device 16 has a belt 38 guided around two deflection rollers 34, 36, of which preferably at least one deflection roller 34, 36 is driven, said belt 38 having segments that respectively have a plurality of bearing element regions. One of these segments is designated with the reference character 40. The recording medium 18 rests with its unprinted back side, or with a back side having an already fixed print image, on the bearing element regions. The belt 38 is driven in the direction of the arrow P2 with the same velocity as the recording medium 18 is moved in the transport direction OP1.

The device 16 furthermore comprises a unit 42 for applying a negative pressure between at least two bearing element regions arranged side by side, in order to move the recording medium 18 via the negative pressure in the direction of a base body of the segment 40, and to deform at least a portion of the bearing element regions. The unit 42 comprises a negative pressure pump 44 and at least one negative pressure distribution chamber 46 that is covered by a belt segment. The bearing element regions stand out from the base body of the segment 40 in the direction of the recording medium.

The design and the function of the device 16 is explained in further detail in the following in connection with FIG. 2.

Figure 2:
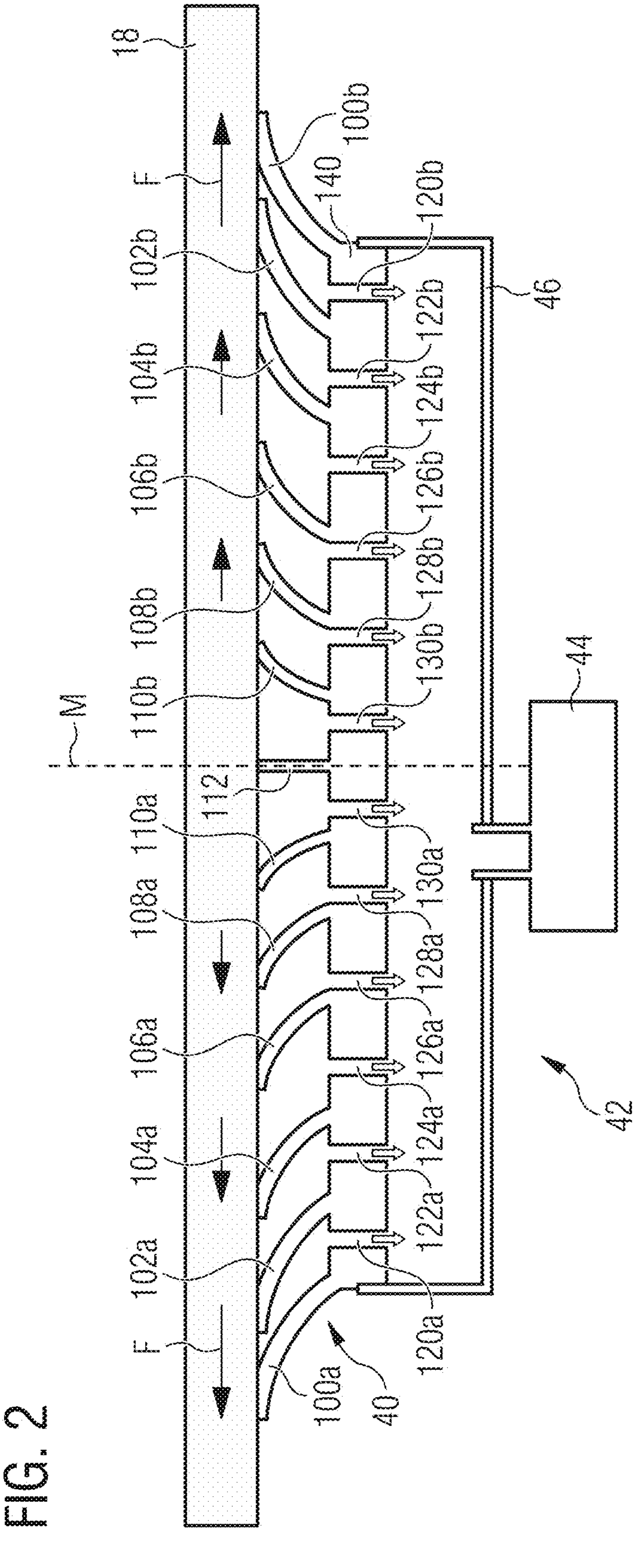
FIG. 2 a schematic depiction of the device for exerting a force on a recording medium printed to on its front side, according to the first embodiment according to FIG. 1.

FIG. 2 shows a schematic section presentation of the device 16 according to FIG. 1. The section plane S travels through the segment 40 shown in FIG. 1, in a plane orthogonal to the transport direction P1. The transport direction P1 travels orthogonal to the plane of the page of FIG. 2. The bearing element regions 100*a*, 100*b*, 102*a*, 102*b*, 104*a*, 104*b*, 106*a*, 106*b*, 108*a*, 108*b*, 110*a*, 110*b*, 112 stand out from the base body 140 of the segment 40 in the direction of the recording medium 18. The length of the bearing element regions 100*a*, 100*b*, 102*a*, 102*b*, 104*a*, 104*b*, 106*a*, 106*b*, 108*a*, 108*b*, 110*a*, 110*b*, 112, from their end connected to the base body 140 to the end distal from the base body 140, decreases with ascending numerals of the reference characters. The intension is to position the bearing elements (lips/work areas) at an increasing angle moving outward, so that the stretching (traction force per length unit) increases continuously toward the side. The bearing element regions 100*a*, 100*b*, 102*a*, 102*b*, 104*a*, 104*b*, 106*a*, 106*b*, 108*a*, 108*b*, 110*a*, 110*b*, 112 have, at their end distal from the base body 140, a contact region for contacting the recording medium 18.

Openings 120*a*, 120*b*, 122*a*, 122*b*, 124*a*, 124*b*, 126*a*, 126*b* 128*a*, 128*b*, 130*a*, 130*b* are present in the base body 140, through which the negative pressure generated by the negative pressure pump 44 arrives in the regions between two respective adjacent The bearing element regions 100*a*, 100*b*, 102*a*, 102*b*, 104*a*, 104*b*, 106*a*, 106*b*, 108*a*, 108*b*, 110*a*, 110*b*, 112 and there generates a negative pressure via which the recording medium 18 is drawn in the direction of the base body 140. The ends of the bearing element regions 100*a*, 100*b*, 102*a*, 102*b*, 104*a*, 104*b*, 106*a*, 106*b*, 108*a*, 108*b*, 110*a*, 110*b* that are distal from the recording base body are hereby pressed downward. Due to their materials, such a static friction exists, between the contact regions of the bearing element regions 100*a*, 100*b*, 102*a*, 102*b*, 104*a*, 104*b*, 106*a*, 106*b*, 108*a*, 108*b*, 110*a*, 110*b*, 112 and the recording medium, that said bearing element regions 100*a*, 100*b*, 102*a*, 102*b*, 104*a*, 104*b*, 106*a*, 106*b*, 108*a*, 108*b*, 110*a*, 110*b*, 112 exert a force on the recording medium further outward toward the lateral edges of the recording medium 18 in the form of a web if said recording medium 18 is moved toward the base body 140 due to the negative pressure between the bearing element regions 100*a*, 100*b*, 102*a*, 102*b*, 104*a*, 104*b*, 106*a*, 106*b*, 108*a*, 108*b*, 110*a*, 110*b*, 112. This force F is represented by force vectors in FIG. 2.

Via this force F, the recording medium 18 is stretched laterally upon fixing the print image on said recording medium's front side, whereby the ripples created by the ink of the print image in the recording medium 18 are reduced or, at least upon viewing of the print product generated in this manner, entirely corrected upon fixing. The device 16 is arranged below the fixing unit 14, wherein the recording medium 18 is guided through between fixing unit 14 and device 16 for fixing. For this, the printer 10 may comprise transport elements (not shown) of a transport unit. The bearing element regions 100*a*, 100*b*, 102*a*, 102*b*, 104*a*, 104*b*, 106*a*, 106*b*, 108*a*, 108*b*, 110*a*, 110*b*, 112 extend at least in a region parallel to the lateral edge of the recording medium 18, or parallel to the center plane M.

Figure 3:
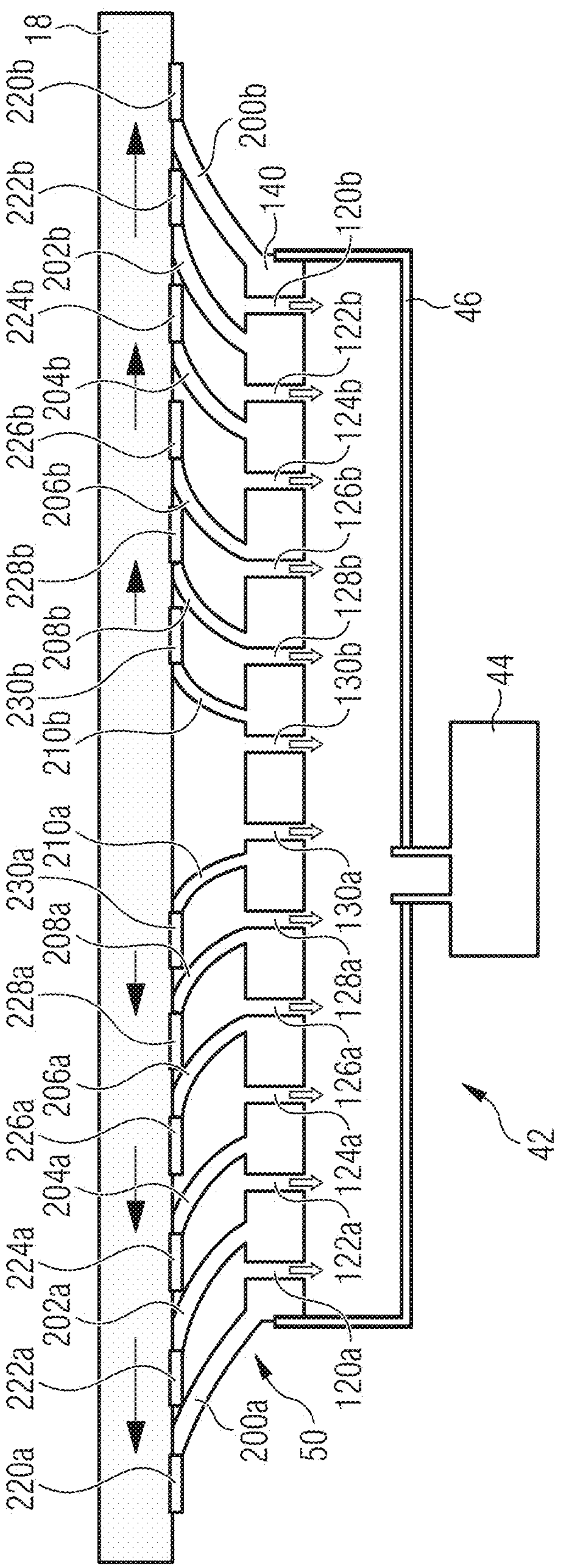
FIG. 3 a schematic depiction of the device for exerting a force on a recording medium printed to on its front side, according to a second embodiment.

FIG. 3 shows a schematic section presentation of a device as an alternative to device 16, for exerting a force on a recording medium 18 printed to on its front side, according to a second embodiment. Elements having the same design or the same function have the same reference characters. The section plane S travels through the segment 40 shown in FIG. 1, in a plane orthogonal to the transport direction P1, wherein in FIG. 3 the section presentation of an alternative segment 50 is shown.

The transport direction P1 of the recording medium 18 travels orthogonal to the plane of the page of FIG. 3. The segment 50 has bearing element regions 200*a*, 200*b*, 202*a*, 202*b*, 204*a*, 204*b*, 206*a*, 206*b*, 208*a*, 208*b*, 210*a*, 210*b* that stand out from the base body 140 of the segment 50 in the direction of the recording medium 18. The length of the bearing element regions 200*a*, 200*b*, 202*a*, 202*b*, 204*a*, 204*b*, 206*a*, 206*b*, 208*a*, 208*b*, 210*a*, 210*b*, from their end connected to the base body 140 to the end distal from the base body 140, decreases with ascending numerals of the reference characters. The inclination of the bearing element regions 200*a*, 200*b*, 202*a*, 202*b*, 204*a*, 204*b*, 206*a*, 206*b*, 208*a*, 208*b*, 210*a*, 210*b*, from their end connected with the base body 140 to the end distal to the base body 140, likewise decreases with ascending numerals of the reference characters, so that the stretching increases outward, thus with decreasing reference characters. The bearing element regions 200*a*, 200*b*, 202*a*, 202*b*, 204*a*, 204*b*, 206*a*, 206*b*, 208*a*, 208*b*, 210*a*, 210*b* have, at their end distal from the base body 140, a respective specially formed contact region 220*a*, 220*b*, 222*a*, 222*b*, 224*a*, 224*b*, 226*a*, 226*b*, 228*a*, 228*b*, 230*a*, 230*b* for contacting the recording medium 18. The design and the function of the contact regions 220*a*, 220*b*, 222*a*, 222*b*, 224*a*, 224*b*, 226*a*, 226*b*, 228*a*, 228*b*, 230*a*, 230*b* is explained in detail in the following in connection with FIGS. 4*a* and 4*b*.

Figure 4B:
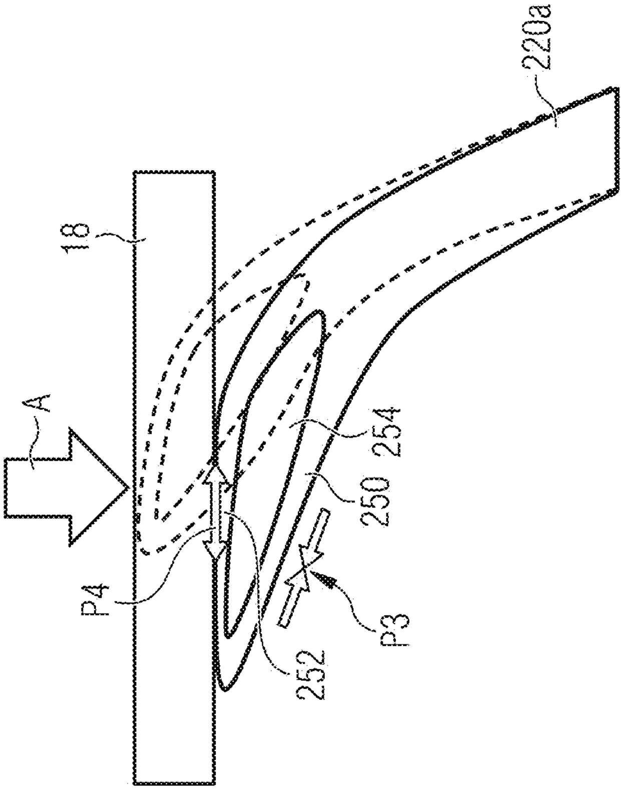
FIG. 4*b* the contact region of the bearing element region of the device according to FIG. 4*a*, with the recording medium.
Figure 4A:
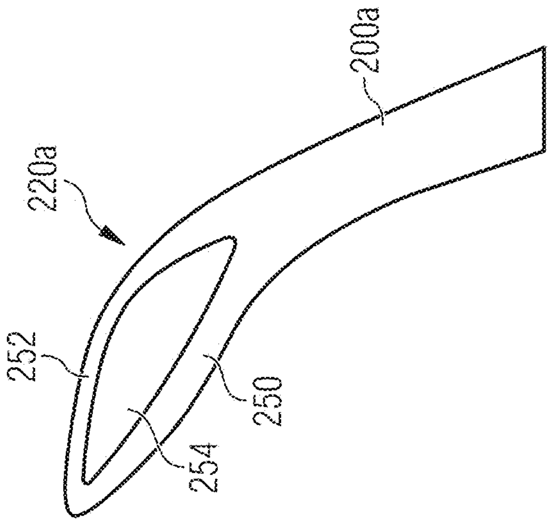
FIG. 4*a* a contact region of a bearing element region of the device according to FIG. 5, without recording medium.

FIGS. 4*a* and 4*b* show, by way of example for all contact regions 220*a*, 220*b*, 222*a*, 222*b*, 224*a*, 224*b*, 226*a*, 226*b*, 228*a*, 228*b*, 230*a*, 230*b* of the bearing element regions 200*a*, 200*b*, 202*a*, 202*b*, 204*a*, 204*b*, 206*a*, 206*b*, 208*a*, 208*b*, 210*a*, 210*b*, the contact region 220*a* of the bearing element region 200*a* of the device according to FIG. 3. Shown in FIG. 4*a* is the contact region 220*a* without recording medium 18, and in FIG. 4*b* with recording medium 18, wherein the recording medium 18 in FIG. 4*b* has been drawn in the direction of the base body 140 by the negative pressure and deformed the contact region 200*a*. The contact region 200*a* is executed as a double-walled system that is designed so that, given a movement of the recording medium 18 toward the base body 140, it is not only the region of the bearing element region 200*a* that is not double-walled that is deformed in the direction of the lateral edge, but rather also the double-walled region. Due to the opening 254 that is present, in the non-deformed state, between the two walls 250, 252 and the inclined arrangement of the contact region 220*a* relative to the recording medium 18, a compression takes place in the region of the wall 250 that is not contacting the recording medium, as this is shown by the pair of arrows P3, and movement in the direction of the lateral edge of the recording medium 18 takes place in the region of the wall 252 contacting the recording medium 18, as arrow P4 shows. The arrow A shows the direction of the movement of the recording medium 18 generated by the negative pressure. The force acting from the recording medium 18 onto the contact region 220*a* is shown by this movement, via which force the deformation of the contact region 220*a* is effected. In this embodiment, the force F acting on the recording medium 18 is produced by a deformation of the entire bearing element region 200*a* toward the lateral edge and by a deformation of the double-walled contact region 220*a*.

Figure 5:
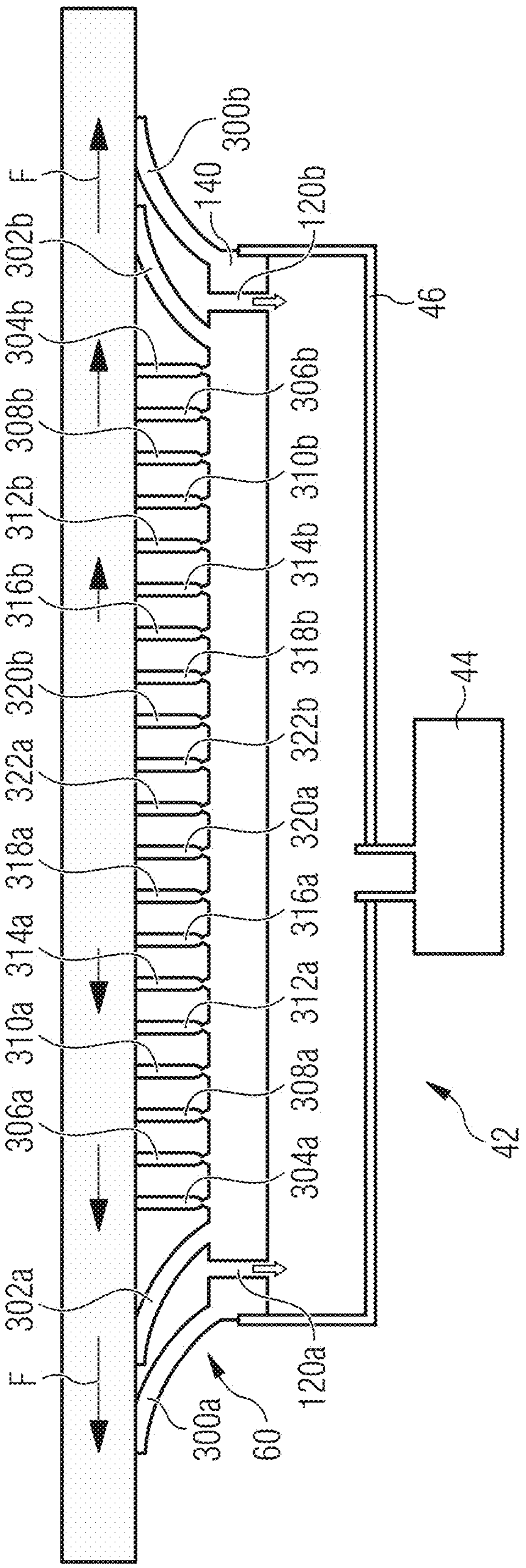
FIG. 5 a schematic depiction of a device for exerting a force on a recording medium printed to on its front side, according to a third embodiment.

FIG. 5 shows a schematic section presentation of a device as an alternative to the device 16, for exerting a force on a recording medium 18 printed to on its front side, according to a third embodiment. The section plane S travels through the segment 40 shown in FIG. 1, in a plane orthogonal to the transport direction P1, wherein the section presentation of an alternative segment 60 is shown in FIG. 5. In this embodiment, only the bearing element regions 300*a*, 300*b*, 302*a*, 302*b* are elastically deformed by the negative pressure applied between these bearing element regions 300*a*, 300*b*, 302*a*, 302*b*, and exert a force in the direction of the lateral edges only in the region of the lateral edges of the recording medium 18. Therefore, lips that form a circumferential seal against the outside are preferably used for the bearing element regions 300, 302. The further bearing element regions 304*a* through 322*b* serve only as supporting elements, in the same manner as the bearing element region 112 in the first embodiment. The further bearing element regions 304*a* through 322*b* can preferably be designed as brushes.

Figure 6:
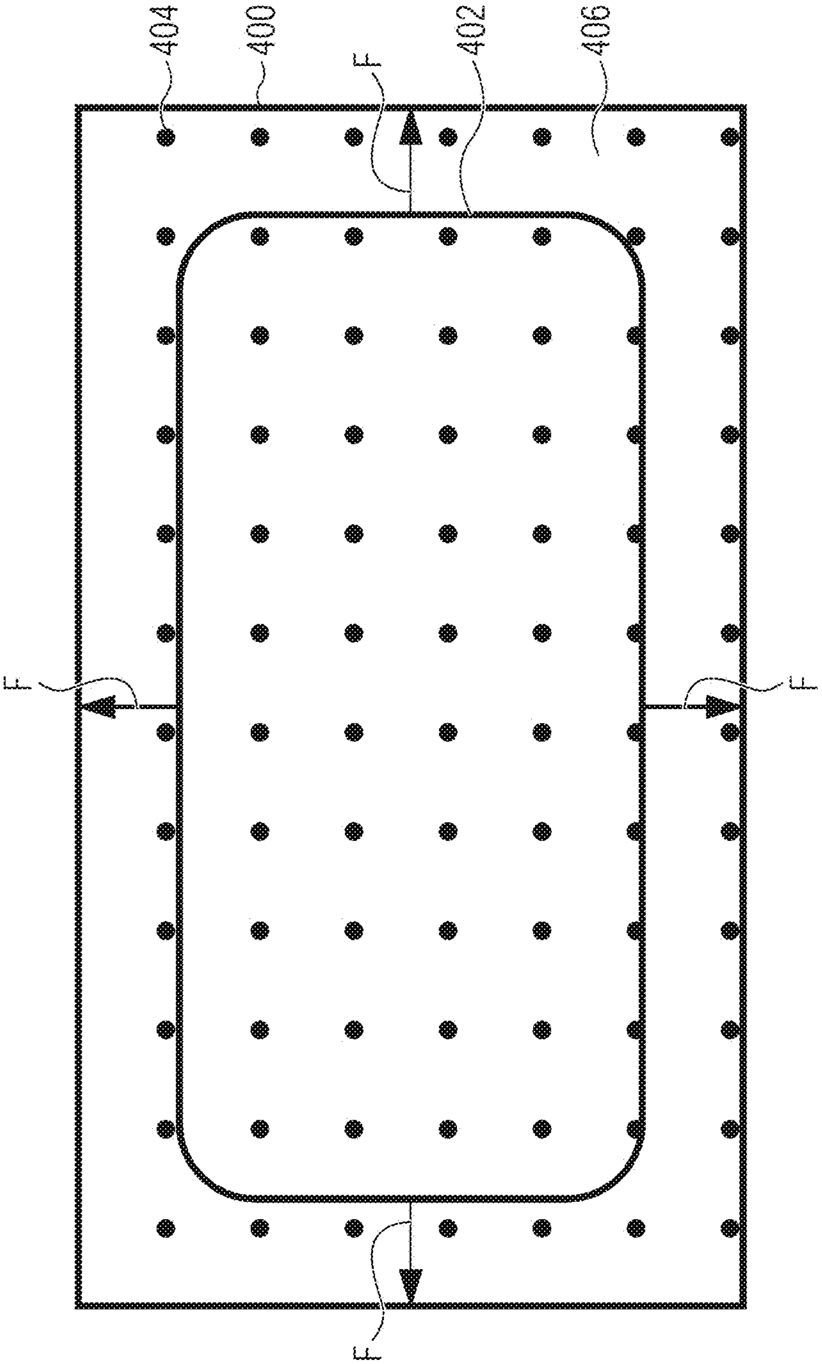
FIG. 6 a schematic depiction of a device for exerting a force on a recording medium printed to on its front side, according to a fourth embodiment.

FIG. 6 shows a simplified schematic plan view of a device for exerting a force on a recording medium 18 that has been printed to on its front side, according to a fourth embodiment. Two circumferentially closed bearing element regions 400, 402 are arranged at a distance from one another, wherein the bearing element regions 400, 402 stand out from a base body 404 in the direction of the recording medium 18 (not shown). The bearing element regions 400, 402 are inclined and/or curved outward, in the direction of the lateral edges and inasmuch counter to the transport direction P1, in the same manner as the bearing element regions 300*a*, 302*a* of the third embodiment. A plurality of openings are present in the intervening space between the bearing element regions 400, 402 arranged at a distance from one another, of which openings one opening is designated with the reference character 406. This tabular arrangement is especially suited to a fixing in a start/stop operation of the printer 10, or given printing to individual sheets. The direction of the force F exerted by the bearing element regions 400, 402 onto the recording medium 18 is illustrated by the arrows.

Figure 7:
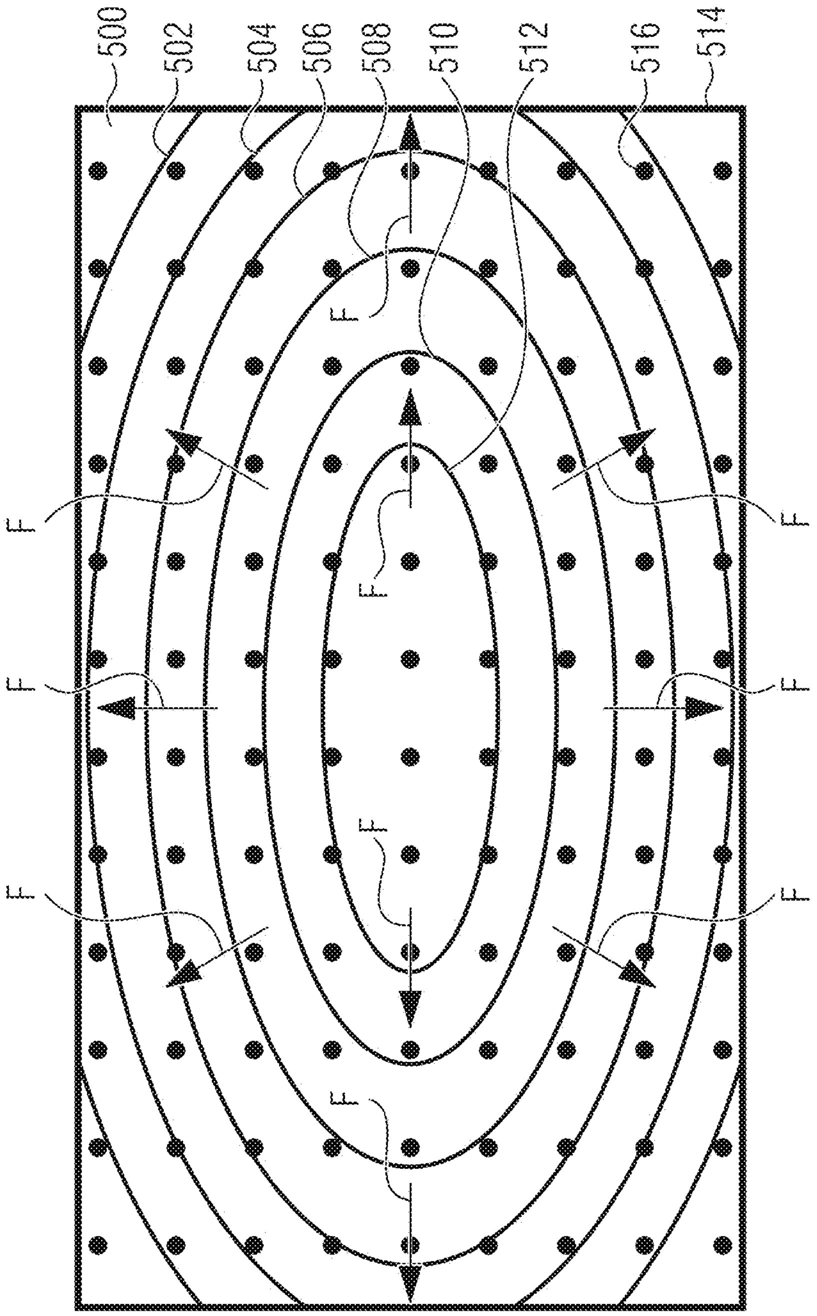
FIG. 7 a schematic depiction of a device for exerting a force on a recording medium printed to on its front side, according to a fifth embodiment.

FIG. 7 shows a simplified schematic plan view of a device for exerting a force on a recording medium 18 printed to on its front side, according to a fifth embodiment. Four circumferentially closed bearing element regions 506 through 512, standing out on elliptical tracks from a base body 500 in the direction of a recording medium 18 (not shown), are arranged at a distance from one another, as well as further bearing element regions 502, 504 arranged on elliptical tracks and, further outward, a bearing element region 514 arranged on a rectangular track. The bearing element regions 502, 504, 514 likewise stand out from the base body 500 in the direction of the recording medium 18 (not shown). The bearing element regions 502 through 514 are inclined and/or curved outward in the direction of the lateral edges, and inasmuch counter to the transport direction P1, in the same manner as the bearing element regions 300*a*, 302*a* of the third embodiment. A plurality of openings are provided in the intervening space between the bearing element regions 502 arranged at a distance from one another, of which one opening is designated with the reference character 516. This tabular arrangement is especially suited to a fixing in a start/stop operation of the printer 10, or given printing to individual sheets. The direction of the force F exerted by the bearing element regions 502 through 514 onto the recording medium 18 is illustrated by the arrows.

The devices according to FIGS. 6 and 7 can also respectively form a segment 40 of the device 16. For this purpose, the base body 404, 500 can respectively be produced from a flexible material, like the segments 40, 50, and 60. The contact regions of the receiving element regions of all embodiments can also be fashioned in the same manner as the contact regions 220*a* through 230*a* and 220*b* through 230*b*.

All receiving element regions are made of an elastically deformable material, in particular of an elastically deformable plastic such as an elastomer or rubber.

Upon printing to individual sheets, the machine direction is not uniformly established and can vary from charge to charge. This is to be taken into account in particular given application of the negative pressure by the device 16, in all embodiments.

The described bearing element regions are components of bearing elements, or respectively form a bearing element.

It is generally noted that a transport unit is not mandatory, since the recording medium can also be essentially immobile while the printing unit are moved over the recording medium. In particular for individual sheets, the present invention has the advantage that, after the application of fluid in the form of ink, finishing fluid such as varnish etc., the device according to the invention can stretch the recording medium along the primary plane of said recording medium, independently of the alignment of fibers, so that the ripples are smoothed or disappear entirely.

REFERENCE CHARACTERS

10 inkjet printer
12 printing unit
14 fixing unit
16 device
18 recording medium
20 to 28 print bars
30 take-off
32 take-up
34, 36 deflection rollers
38 belt
40, 50, 60 segment
42 negative pressure unit
44 negative pressure pump
46 negative pressure distribution chamber
100*a* to 110*a*, 100*b* to 110*b*, 112, 200*a* to 210*a*, 200*b* to 210*b*,
300*a* to 318*a*, 300*b* to 318*b*, 400, 402, 502 to 514, bearing element regions/bearing elements
120*a*, 120*b*, 122*a*, 122*b*, 124*a*, 124*b*, 126*a*, 126*b* 128*a*, 128*b*, 130*a*, 130*b*, 406, 516 openings
220*a* to 220*b* contact regions
140, 404, 500 base bodies
P1, P2, P3, P4 direction
F force
S section plane
M center plane

The invention claimed is:

1. A device for exerting a stretching on a recording medium, the device comprising:

a first unit arranged opposite a back side of the recording medium, the first unit comprising:

a base body having a plurality of bearing elements;

a plurality of bearing element regions of at least one bearing element, said bearing element regions standing out from the base body, wherein the bearing element regions respectively have at least one contact region on which the recording medium rests with the back side thereof, wherein the bearing element regions stand out from the base body in a direction of the recording medium, wherein an end of at least a portion of the bearing element regions that is connected with the base body has a smaller distance from a center plane running in the transport direction, said center plane being orthogonal to the transport direction and/or to the longitudinal axis of the recording medium, than the contact region of the same bearing element, and a second unit for applying a negative pressure between at least two bearing element regions arranged next to one another, in order to move the recording medium in a direction of the base body due to the negative pressure, and to deform at least a portion of the bearing element regions.

2. The device according to claim 1, wherein a first end of each bearing element region is connected to the base body, and wherein the contact region is arranged at a second end of the bearing element region, said second end being distal from the base body.

3. The device according to claim 2, wherein the contact region of the first end of the bearing element region forms an angle vertex, wherein the length between angle vertex and contact region forms a first angle leg and wherein the base body forms a second angle leg, wherein an angle of inclination defined in this way is arranged in a plane orthogonal to a transport direction.

4. The device according to claim 3, wherein the angle of inclination has a value in a range of from 45° to 85°.

5. The device according to claim 3, wherein the angle of inclination has a value in a range of from 65° to 75°.

6. The device according to claim 2, wherein at least one of the bearing element region or the contact region extends parallel to the transport direction.

7. The device according to claim 1, wherein the lateral edges of the recording medium run parallel to a transport direction.

8. The device according to claim 7, wherein a first portion of the bearing element regions are arranged to the left, in the transport direction, and a second portion of the bearing element regions are arranged to the right, in the transport direction, of a center plane running in the transport direction, said center plane being orthogonal to the transport direction and/or to a longitudinal axis of the recording medium.

9. The device according to claim 1, wherein the bearing element regions arranged at the lateral edge of the recording medium are at least one of angled, curved, or inclined, starting from the end connected to the base body, toward the respective lateral edge.

10. The device according to claim 1, wherein the contact region is in the form of a lip.

11. The device according to claim 1, wherein the device is arranged below a fixing unit for fixing an inkjet print image onto the recording medium.

12. The device according to claim 11, wherein the device is arranged below a second half of the fixing unit in a transport direction.

13. A method for exerting a stretching on a recording medium, the method comprising:

resting the recording medium with a back side thereof on at least one respective contact region of a plurality of bearing element regions of at least one bearing element, said bearing element regions standing out from a base body, wherein the bearing element regions stand out from the base body in a direction of the recording medium, wherein an end of at least a portion of the bearing element regions that is connected with the base body has a smaller distance from a center plane running in the transport direction, said center plane being orthogonal to the transport direction and/or to the longitudinal axis of the recording medium, than the contact region of the same bearing element, and applying a negative pressure between at least two bearing element regions arranged next to one another, via which negative pressure the recording medium is moved in a direction of the base body, and at least a portion of the bearing element regions are deformed such that they exert a force on the recording medium in a direction of the respective lateral edge.

* * * * *